US010038552B2

(12) United States Patent
Haridas et al.

(10) Patent No.: US 10,038,552 B2
(45) Date of Patent: Jul. 31, 2018

(54) EMBEDDED SECURITY ARCHITECTURE FOR PROCESS CONTROL SYSTEMS

(71) Applicant: Honeywell International, Inc., Morris Plains, NJ (US)

(72) Inventors: Harshal S. Haridas, Jamison, PA (US); Alexander Chernoguzov, Warrington, PA (US); Michal Hojsik, Prague (CZ); Stanley Gorzelic, Bethlehem, PA (US); Mukunda Gudi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 79 days.

(21) Appl. No.: 14/954,550

(22) Filed: Nov. 30, 2015

(65) Prior Publication Data
US 2017/0155511 A1    Jun. 1, 2017

(51) Int. Cl.
*H04L 9/08* (2006.01)
(52) U.S. Cl.
CPC .......... *H04L 9/0819* (2013.01); *H04L 9/0841* (2013.01); *H04L 2209/12* (2013.01)
(58) Field of Classification Search
CPC .................................................... H04L 9/0819
See application file for complete search history.

(56) References Cited

U.S. PATENT DOCUMENTS

| 5,519,603 | A | * | 5/1996 | Allbery, Jr. ............. G05B 9/03 700/4 |
| 6,243,695 | B1 | | 6/2001 | Assaleh et al. |
| 6,560,656 | B1 | * | 5/2003 | O'Sullivan ........... G06F 9/4416 709/220 |
| 6,983,994 | B2 | | 1/2006 | Pino |
| 6,990,379 | B2 | | 1/2006 | Gonzales et al. |
| 7,069,580 | B1 | * | 6/2006 | Deitz ................. G05B 19/0428 713/168 |
| 7,284,278 | B2 | | 10/2007 | Anson et al. |
| 7,657,946 | B2 | | 2/2010 | Yan et al. |
| 8,381,306 | B2 | | 2/2013 | McPherson et al. |
| 8,429,435 | B1 | * | 4/2013 | Clayton ................. H04L 12/10 700/19 |

(Continued)

OTHER PUBLICATIONS

Gupta et al.; Networked Control System: Overview and Research Trends; Published in: IEEE Transactions on Industrial Electronics ( vol. 57, Issue: 7, Jul. 2010 ); IEEE Xplore (Year: 2010).*

(Continued)

*Primary Examiner* — Bradley Holder

(57) ABSTRACT

An apparatus includes a first distributed control system (DCS) node. The first DCS includes at least one interface configured to communicate, over a network, with a second DCS node. The first DCS node also includes at least one processing device. The processing device is configured to exchange a security association policy with the second DCS node. The processing device is also configured to exchange public keys with the second DCS node using the security association policy. The processing device is also configured to send a public key of the second DCS node to a field programmable gate array of the first DCS node. The processing device is also configured to receive a shared secret from the field programmable gate array. The processing device is also configured to generate a hash of a message using the shared secret.

17 Claims, 10 Drawing Sheets

(56) References Cited

U.S. PATENT DOCUMENTS

| | | | |
|---|---|---|---|
| 8,873,746 B2 | 10/2014 | Long et al. | |
| 9,038,162 B2 | 5/2015 | Hegiu et al. | |
| 2003/0061481 A1* | 3/2003 | Levine | H04L 9/0836 |
| | | | 713/163 |
| 2003/0088650 A1 | 5/2003 | Fassold et al. | |
| 2004/0015262 A1 | 1/2004 | Brown et al. | |
| 2004/0103165 A1* | 5/2004 | Nixon | H04W 72/02 |
| | | | 709/217 |
| 2004/0153171 A1* | 8/2004 | Brandt | G05B 15/02 |
| | | | 700/9 |
| 2004/0177264 A1 | 9/2004 | Anson et al. | |
| 2005/0060584 A1* | 3/2005 | Ginter | H04L 9/3263 |
| | | | 726/4 |
| 2005/0102514 A1 | 5/2005 | Bergenwall et al. | |
| 2005/0251680 A1* | 11/2005 | Brown | H04L 63/061 |
| | | | 713/171 |
| 2005/0256735 A1 | 11/2005 | Bayne | |
| 2006/0282876 A1 | 12/2006 | Shelest | |
| 2006/0291438 A1* | 12/2006 | Karschnia | G05B 19/042 |
| | | | 370/338 |
| 2007/0199046 A1* | 8/2007 | O'Brien | G06F 21/72 |
| | | | 726/2 |
| 2007/0283443 A1 | 12/2007 | McPherson et al. | |
| 2008/0086632 A1* | 4/2008 | Kagle | H04L 9/00 |
| | | | 713/150 |
| 2009/0177289 A1 | 7/2009 | Glanzer et al. | |
| 2009/0276537 A1 | 11/2009 | Deverick et al. | |
| 2010/0050267 A1 | 2/2010 | Nochta et al. | |
| 2010/0161817 A1 | 6/2010 | Xiao | |
| 2011/0182427 A1 | 7/2011 | Long et al. | |
| 2011/0231450 A1 | 9/2011 | Sinha | |
| 2012/0117380 A1 | 5/2012 | Herberth et al. | |
| 2012/0174182 A1 | 7/2012 | Neely | |
| 2012/0266214 A1 | 10/2012 | Hegiu et al. | |
| 2013/0031360 A1* | 1/2013 | Dewitz | H04L 63/0823 |
| | | | 713/156 |
| 2013/0111211 A1 | 5/2013 | Winslow et al. | |
| 2013/0198799 A1 | 8/2013 | Staggs et al. | |
| 2014/0007253 A1 | 1/2014 | Hardt | |
| 2015/0215338 A1 | 7/2015 | Haridas et al. | |
| 2015/0215339 A1 | 7/2015 | Chernoguzov et al. | |
| 2015/0244742 A1 | 8/2015 | Reynolds et al. | |

OTHER PUBLICATIONS

Lorch et al.; First experiences using XACML for access control in distributed systems; Published in: Proceeding XMLSEC'03 Proceedings of the 2003 ACM workshop on XML security; pp. 25-37; ACM Digital Library (Year: 2003).*

International Search Report dated Apr. 28, 2015 in connection with International Application No. PCT/US2015/015337.

Written Opinion of the International Searching Authority dated Apr. 28, 2015 in connection with International Application No. PCT/US2015/015337.

Microsoft; "How IPSec Works"; Security Policy; Security Services; Mar. 28, 2003; 31 pages.

Wikipedia; "IPsec"; retrieved from http://en.wikipedia.org/w/index.php?title=IPsec&oldid=619949512#Encapsulating_Security_Payload; Aug. 5, 2014; 10 pages.

Extended European Search Report dated Jun. 15, 2015 in connection with European Patent Application No. 14192912.5; 7 pages.

Croft, et al.; "Bootstrap Protocol (BOOTP)"; Network Working Group; Sep. 1985; 12 pages.

Alexander, et al.; "DHCP Options and BOOTP Vendor Extensoins"; Network Working Group; Mar. 1997; 34 pages.

Wikipedia; "Bootstrap Protocol"; retrieved from http://en.wikipedia.org/wiki/Bootstrap_Protocol&oldid=599915347; Mar. 2014; 3 pages.

International Search Report dated Apr. 28, 2015 in connection with International Application No. PCT/US2015/011937.

Written Opinion of the International Searching Authority dated Apr. 28, 2015 in connection with International Application No. PCT/US2015/011937.

* cited by examiner

EMBEDDED SECURITY ARCHITECTURE FOR PROCESS CONTROL SYSTEMS

TECHNICAL FIELD

This disclosure is generally directed to communication networks. More specifically, this disclosure is directed to an apparatus and method for an embedded security architecture that incorporates use of a security microcontroller and field programmable gate array (FPGA) components.

BACKGROUND

Industrial control systems (ICS) have been required to employ an increasing level of security defense mechanisms as they evolve from closed proprietary systems in the early 1990s to convenient, connected and open systems over the years (now at the advent of cloud and Internet of Things (IoT)). The adopted open systems in the mid-late nineties provided a trend shift for increased convenience, improved connectivity and thus, improved productivity. However, these systems became more vulnerable to exploits due to the widespread knowledge about open system vulnerabilities. To mitigate these concerns, security architectures began mandating perimeter security and security hardened nodes. However, subsequent introduction of virtual platforms and remote access support further required additional security countermeasures to prevent unauthorized accesses and system privilege gains by individuals. Security architectures and solutions thus continue to evolve based on system capabilities and with a common theme to prevent external exploitation of system vulnerabilities.

ICS solution vendors have adopted encrypted and authenticated communications and role based access control to mitigate insider attacks by developing solutions that employed many security principles including least privilege principle, segregation of duties and defense in depth.

SUMMARY

This disclosure provides an apparatus and method for an embedded security architecture that incorporates use of a security microcontroller and field programmable gate array (FPGA) components.

In a first example, a method includes exchanging, by a first distributed control system (DCS) node, a security association policy with a second DCS node over a network. The method also includes exchanging public keys with the second DCS node using the security association policy. The method also includes sending a public key of the second DCS node to a field programmable gate array of the first DCS node. The method also includes receiving a shared secret from the field programmable gate array. The method also includes generating a hash of a message using the shared secret.

In a second example, an apparatus includes a first DCS node. The first DCS includes at least one interface configured to communicate, over a network, with a second DCS node. The first DCS node also includes at least one processing device. The processing device is configured to exchange a security association policy with the second DCS node. The processing device is also configured to exchange public keys with the second DCS node using the security association policy. The processing device is also configured to send a public key of the second DCS node to a field programmable gate array of the first DCS. The processing device is also configured to receive a shared secret from the field programmable gate array. The processing device is also configured to generate a hash of a message using the shared secret.

In a third example, a non-transitory computer readable medium includes a computer program. The computer program comprises computer readable program code for exchanging, by a first DCS node, a security association policy with a second DCS node over a network. The computer readable program code is also for exchanging public keys with the second DCS node using the security association policy. The computer readable program code is also for sending a public key of the second DCS node to a field programmable gate array of the first DCS node. The computer readable program code is also for receiving a shared secret from the field programmable gate array. The computer readable program code is also for generating a hash of a message using the shared secret.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 9, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

One or more embodiments recognize that the adoption of encrypted communication came at an expense of significant performance degradation and a robust security design. Encrypted communication alone was not sufficient to address other security concerns like malware exploitation through firmware injection on embedded nodes through regular and non-standard channels. The use of open systems combined with the availability of hardware through non-direct channels further makes it simpler for rogue individuals to acquire hardware and carry out malware attacks.

One or more embodiments provide a high performance and robust embedded security architecture that uses a combination of software, field programmable gate array (FPGA), and a security microcontroller to achieve encrypted communication by offloading the CPU intensive security computations. One or more embodiments also provide a combined solution of verifying signed firmware and subsequent lock down in validation failure scenarios to prevent executing non-authorized software on embedded devices. The combination of high performance and a locked down embedded node will continue to be the minimum required for future cloud integration and IoT devices as connectivity takes a whole new definition in upcoming architectures with open protocol connectivity.

Figure 1:
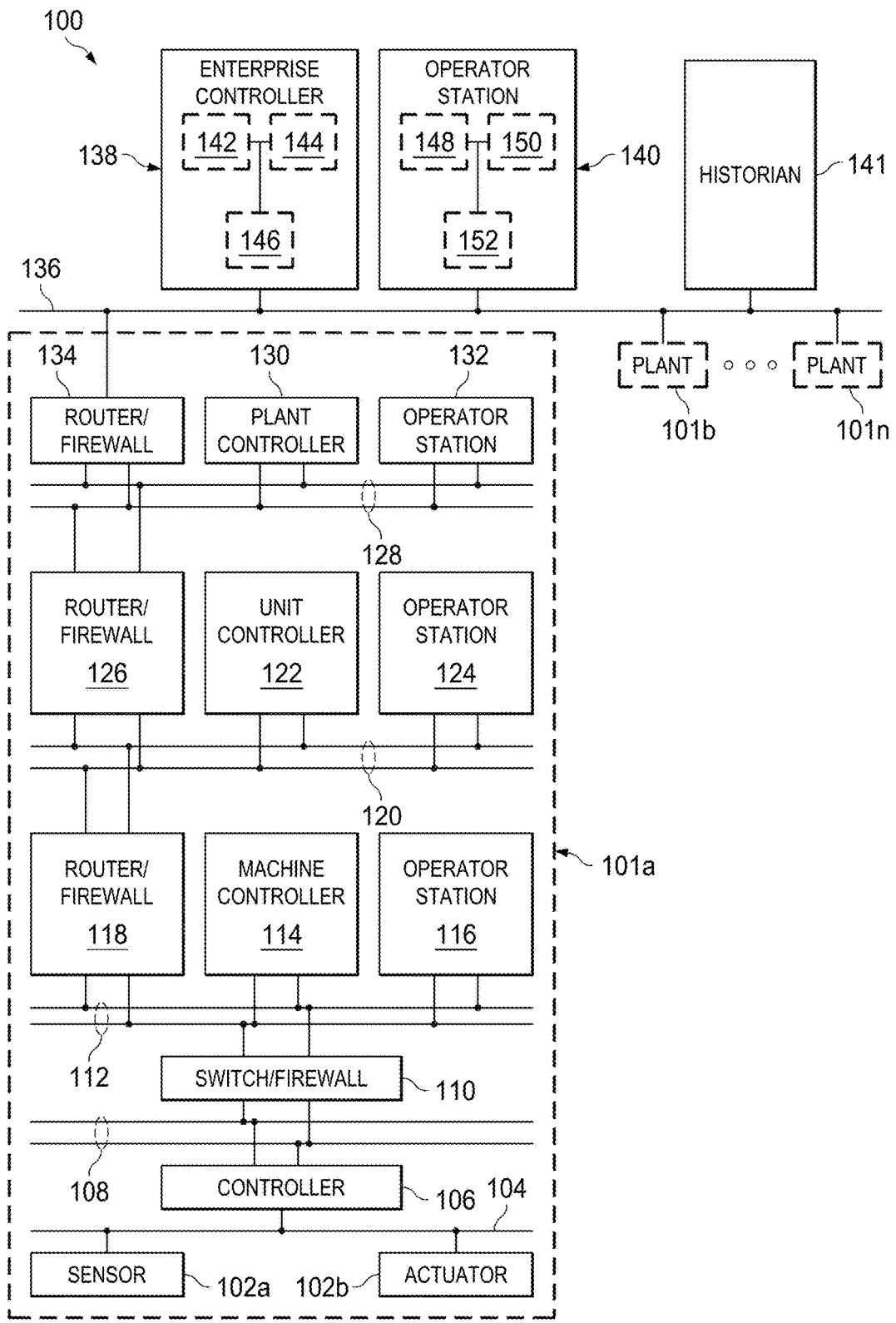
FIGS. 1 and 2 illustrate an example industrial process control and automation system and related details according to this disclosure.
Figure 2:
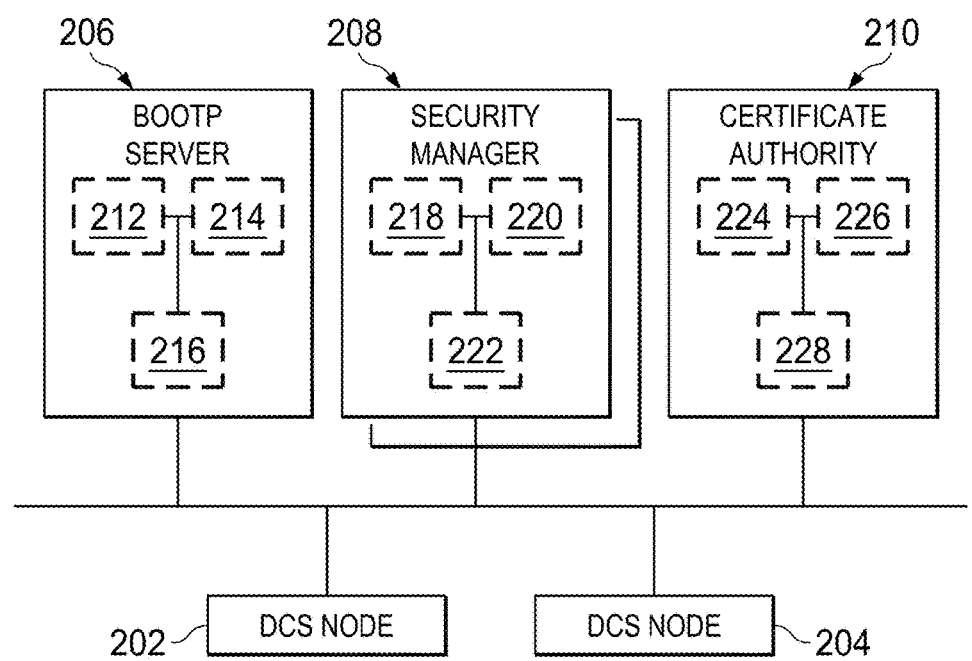

FIGS. 1 and 2 illustrate an example industrial process control and automation system 100 and related details according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As described above, conventional industrial process control and automation systems are often vulnerable to illicit access and use. In various embodiments, this disclosure employs the use of bootstrap protocol (BOOTP) extensions, canned policies applications, node-to-node negotiations, and subnetwork routing to secure a distributed control system (DCS) while maintaining availability and protecting network communications. This functionality can be implemented in any of the nodes shown in FIG. 1, such as in any of the controllers or operator stations of FIG. 1. In particular embodiments, this functionality can be implemented in the controllers or operator stations below Level 3 of the industrial process control and automation system 100.

Details of this functionality are shown in FIG. 2, where communications between two DCS nodes 202-204 can be protected as described below. The DCS nodes 202-204 could represent any suitable devices in a DCS, such as any of the controllers or operator stations shown in FIG. 1.

Also shown in FIG. 2 are a BOOTP server 206, a security manager 208, and a certificate authority (CA) 210. As described in more detail below, the BOOTP server 206 supports the use of a bootstrap protocol extension, which allows the BOOTP server 206 to inform the DCS nodes 202-204 of the network address and ports of the security manager 208. The DCS nodes 202-204 can communicate with the security manager 208 via both open and encrypted channels using the information from the BOOTP server 206. The security manager 208 operates to maintain information about DCS nodes that have been configured or are in the process of being configured to support secure communications between the DCS nodes 202-204. The security manager 208 also provides security credentials (such as certificates) to the DCS nodes 202-204, allowing the DCS nodes 202-204 to communicate securely with one another. The certificate authority 210 generates the certificates or other security credentials provided by the security manager 208. More detailed descriptions of the operations of the BOOTP server 206, security manager 208, and certificate authority 210 in conjunction with the DCS nodes 202-204 are provided below.

The BOOTP server 206 includes any suitable structure supporting use of a bootstrap protocol. For example, the BOOTP server 206 could include one or more processing devices 212 and one or more memories 214 for storing instructions and data used, generated, or collected by the processing device(s) 212. The BOOTP server 206 could also include at least one network interface 216, such as one or more Ethernet interfaces or wireless transceivers.

The security manager 208 includes any suitable structure for providing security credentials to DCS nodes. For instance, the security manager 208 could include one or more processing devices 218 and one or more memories 220 for storing instructions and data used, generated, or collected by the processing device(s) 218. The security manager 208 could also include at least one network interface 222, such as one or more Ethernet interfaces or wireless transceivers. There could be one or multiple security managers 208 in the system, such as one security manager 208 per unit-level controller 122.

The certificate authority 210 includes any suitable structure for generating security credentials. For example, the certificate authority 210 could include one or more processing devices 224 and one or more memories 226 for storing instructions and data used, generated, or collected by the processing device(s) 224. The certificate authority 210 could also include at least one network interface 228, such as one or more Ethernet interfaces or wireless transceivers.

The BOOTP server 206, security manager 208, and certificate authority 210 could be used at any suitable level(s) in the industrial process control and automation system 100. For example, in some embodiments, the BOOTP server 206, security manager 208, and certificate authority 210 could represent Level 3, Level 4, or Level 5 components and could be used to secure DCS nodes at Level 1, Level 2, or Level 3 of the system 100.

Although FIGS. 1 and 2 illustrate one example of an industrial process control and automation system 100 and related details, various changes may be made to FIGS. 1 and 2. For example, a control and automation system could include any number of sensors, actuators, controllers, operator stations, networks, DCS nodes, BOOTP servers, security managers, and CAs. Also, the makeup and arrangement of the system 100 in FIGS. 1 and 2 are for illustration only. Components could be added, omitted, combined, or placed in any other suitable configuration according to particular needs. As a particular example, two or more of the BOOTP server 206, security manager 208, and certificate authority 210 could be combined into a single functional unit. Further, particular functions have been described as being performed by particular components of the system 100. This is for illustration only. In general, process control and automation systems are highly configurable and can be configured in any suitable manner according to particular needs. In addition, FIGS. 1 and 2 illustrate an example environment in which a DCS can be secured. This functionality can be used in any other suitable device or system.

Figure 3:
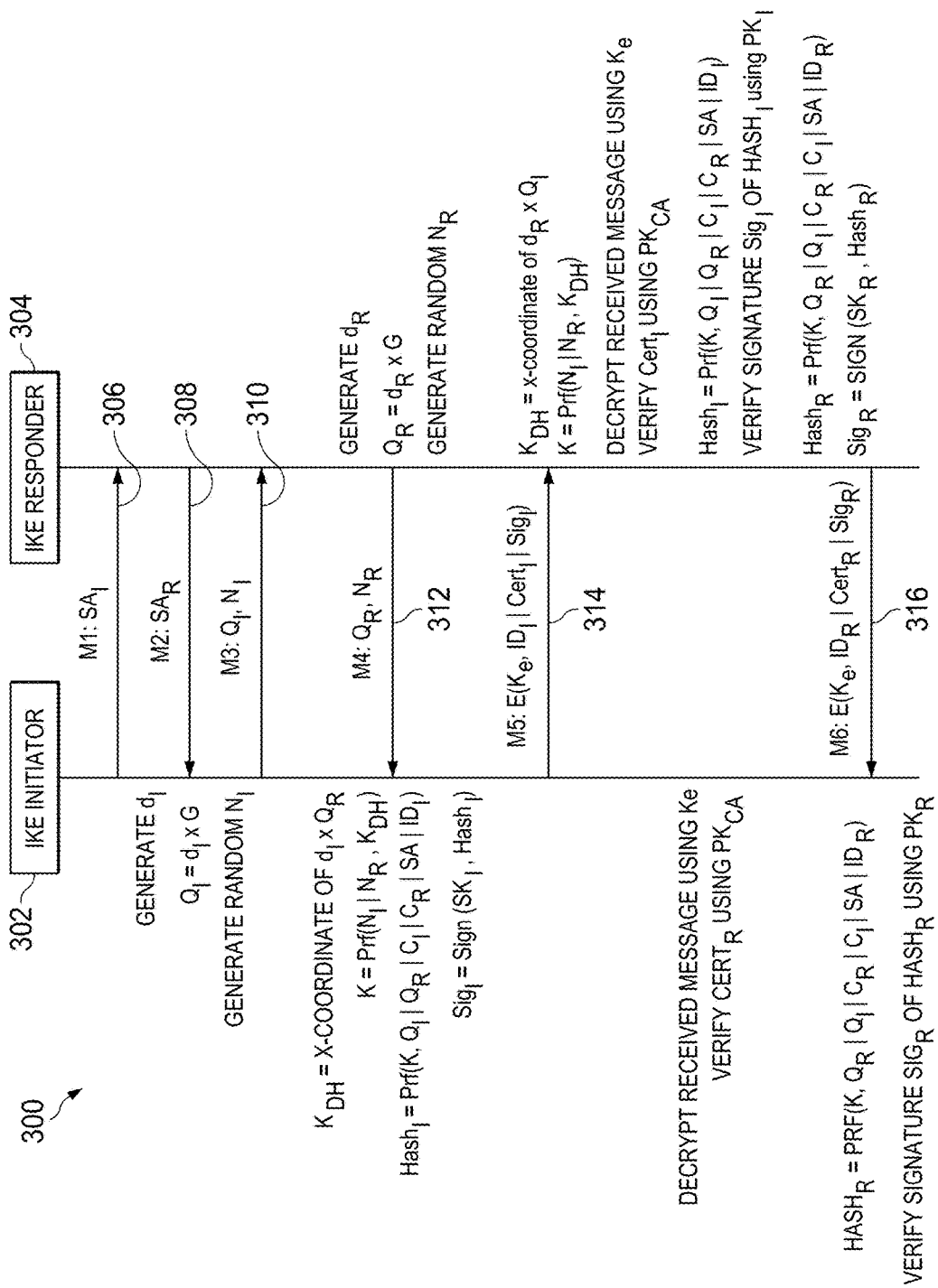
FIG. 3 illustrates an example signaling diagram for setting up security associations in an Internet key exchange (IKE) protocol according to this disclosure.

FIG. 3 illustrates an example signaling diagram 300 for setting up security associations in an Internet key exchange (IKE) protocol according to this disclosure. The communication can be between an IKE initiator 302 and an IKE responder 304.

Encrypted communication at the IP layer can be achieved by employing IPsec as specified in RFC 2401. In IPsec, IKE is the protocol used to setup and maintain security associations (SAs). FIG. 3 describes six messages exchanged in an IKE main mode. TABLE 1 provides the notations used in FIG. 3.

TABLE 1

| | |
|---|---|
| $SA_I$ | Initiator's SA negotiation payload |
| $SA_R$ | Responder's SA negotiation payload |
| SA | Entire SA payload |
| G | P-256 generator |
| $d_I$ | Initiator's Diffie-Hellman (DH) private key |
| $Q_I$ | Initiator's DH public key |
| $d_R$ | Responder's DH private key |
| $Q_R$ | Responder's DH public key |
| $N_I$ | Initiator's random nonce |
| $N_R$ | Responder's random nonce |
| $K_{DH}$ | DH shared secret ($K_{DH}$ is the x-coordinate of the point $d_I \times Q_R = d_R \times Q_I = d_I \times d_R \times G$) |
| K | Secret key derived from nonces and DH shared secret |
| $K_e$ | Encryption key derived from K, $K_{DH}$ and $C_I$ and $C_R$ |
| $C_I$ | Initiator's cookie from the ISAKMP header |
| $C_R$ | Responder's cookie from the ISAKMP header |
| Prf(K, X) | (Keyed) Pseudo-random function, namely HMAC-SHA-256(K, X) |
| CA | (Run time) Certification authority |
| $PK_{CA}$ | CA's EDSA-256 public key |
| $SK_I$ | Initiator's EDSA-256 private key |
| $PK_I$ | Initiator's EDSA-256 public key |
| $Cert_I$ | Initiator's EDSA-256 public key certificate issued by CA |
| $SK_R$ | Responder's EDSA-256 private key |

TABLE 1-continued

| | |
|---|---|
| $PK_R$ | Responder's EDSA-256 public key |
| $Cert_R$ | Responder's EDSA-256 public key certificate issued by CA |
| $ID_I$ | Initiator's identification payload |
| $ID_R$ | Responder's identification payload |

The IKE protocol main mode comprises of six messages labeled m1-m6. At message 306, the IKE initiator 302 sends m1 including SA negation payload to the IKE responder 304. At message 308, the IKE responder 304 sends m2 including a SA negation payload to the IKE initiator 302. Messages m1 and m2 negotiate proposals that will be used in subsequent protocol communication (m3-m6).

At message 310, the IKE initiator 302 sends m3 including a Diffie-Hellman (DH) public key and a random nonce to IKE responder 304. At message 312, the IKE responder 304 sends m4 including a DH public key and a random nonce to IKE initiator 302. Messages m3 and m4 perform DH key agreement and nonce exchange. A shared secret is generated from these messages to use for subsequent protocol communication (messages m5 and m6).

At message 314, the IKE initiator 302 sends m5 including an encryption key, identification payload, EDSA-256 public key certificate issued by CA, EDSA-256 private key, and hash to IKE responder 304. At message 316, the IKE responder 304 sends m6 including an encryption key, identification payload, EDSA-256 public key certificate issued by CA, EDSA-256 private key, and hash to IKE initiator 302. Messages m5 and m6 authenticate the two endpoints and the DH exchange.

In one or more embodiments, the security computations are categorized and grouped below into CPU intensive and CPU non-intensive security constructs:

CPU Intensive Security Constructs:
  Key Generation—A combination of a single random number generation and one point multiplication (examples: Generate dI, QI=dI*G).
  Random Number Generation—A random number generation (examples: Generate random NI, Generate random NR).
  ECDH—A single point multiplication (examples: KDH=x-coordinate of dI*QR).
  Message Signing operation—(example: SigI=Sign (SKI, HashI)).
  Message Verification operation—(example: Verify signature SigI of HashI using PKI).
CPU non-intensive Security constructs:
  Message Hash calculation: SHA256 hash of data (HashI=Prf(K, QI|QR|CI|CR|SA|IDI).
  Message Symmetric Encryption/Decryption: (examples: E(Ke, ID|Cert|SigI), Decrypt received message using K).

One or more embodiments recognize and take into account that within DCS systems, all operations are typically carried out in software. A single IKE negotiation that combines the above security constructs need 207 ms on average of CPU cycle time on a dual core symmetric multiprocessing ARM processor at 666 MHz clock speed or 280-300 ms of CPU cycle time on a single core Power PC architecture at 400 Mhz clock speed.

Even though the time taken to complete an IKE negotiation is a few hundred milliseconds, DCS applications continue to be plagued with the challenges with the software only solutions.

One or more embodiments recognize and take into account that a software only approach is not robust. There is a key storage and persistence needed for software generated keys. The selections are non-volatile memory locations on EEPROM chips. These locations are accessible through software and hence, vulnerable to malware attacks. The keys could be compromised, erased and overwritten by injecting and executing firmware and thus defeating the security intent.

One or more embodiments recognize and take into account extended temperature range support. DCS embedded systems are required to support extended temperatures due to their installation profile in open fields and with minimum protection. As a result, limiting power dissipation is critical in architecture selection. This translates to minimizing clock speeds to help minimize the power dissipation, a design contrary to other industries (example: consumer electronics) where clock speeds have increased in multi-fold numbers and where software only security solutions are readily acceptable.

One or more embodiments recognize and take into account that a software only approach performance does not scale. In software only solutions, the total CPU time taken to execute a large number (such as a hundred IKE negotiations) of IKE negotiations concurrently is unacceptable (especially in startup or redundant node failover scenarios). Furthermore, the CPU is shared with other critical applications on single core Power PC architecture or an ARM dual core symmetric multiprocessing architecture further delaying the last IKE negotiation completion time. This can result in network communications being delayed resulting in a temporary loss of view of the embedded node, a situation unacceptable during plant operations in critical sectors.

Figure 4:
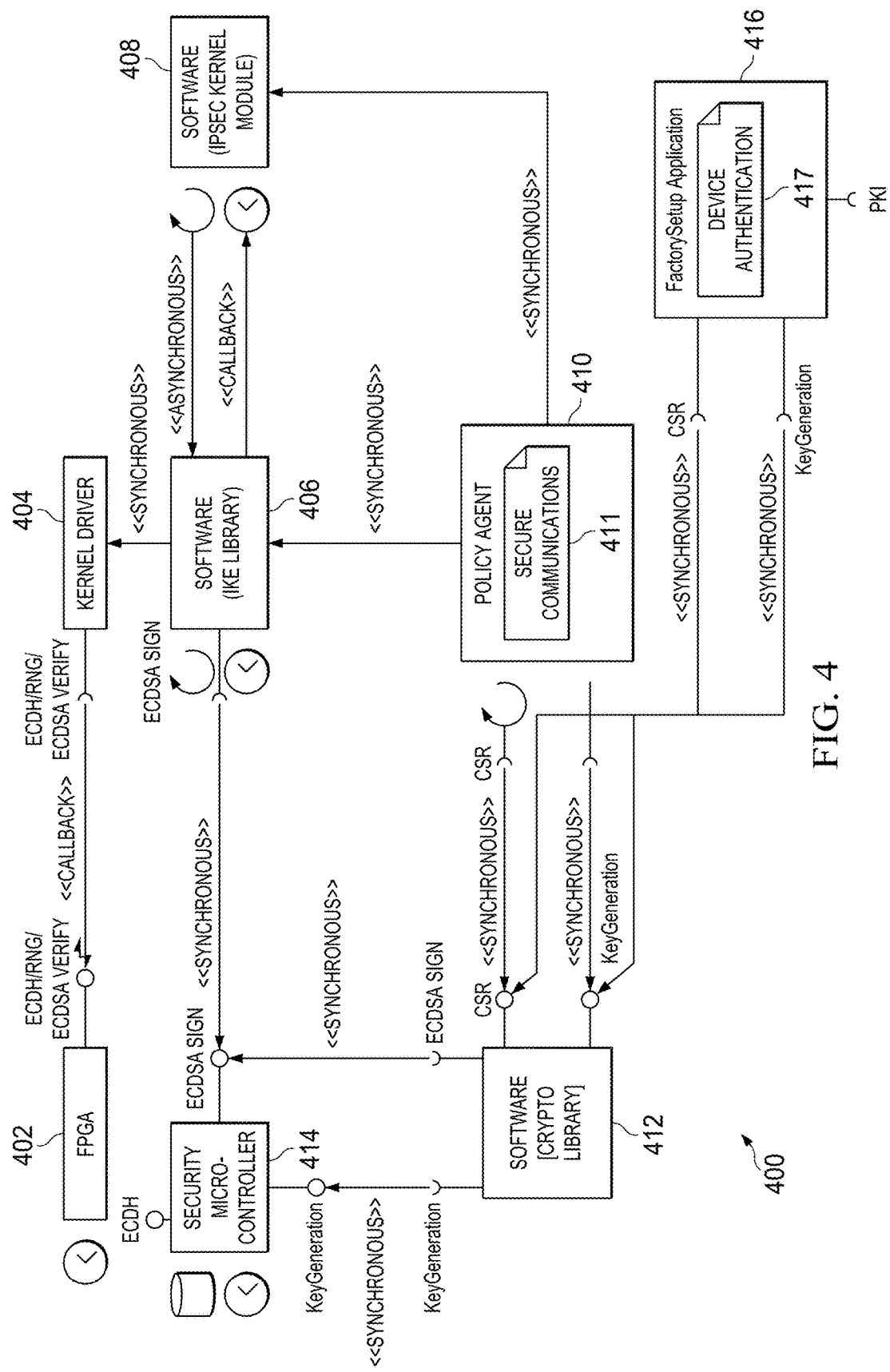
FIG. 4 illustrates an example embedded security architecture according to this disclosure.

FIG. 4 illustrates an example embedded security architecture 400 according to this disclosure. The embedded security architecture 400 describes a security architecture for embedded systems. The architecture achieves a high performance relative to software only solutions for IKE negotiations by using a combination of security microcontroller, FPGA and software. Software continues to be at the heart of achieving encrypted communication with the CPU intensive security constructs offloaded to more performant peripheral support devices.

In FIG. 4, the embedded security architecture 400 includes FPGA 402, kernel driver 404, IKE library 406, IPsec kernel module 408, policy agent 410 with secure communications 411, crypto library 412, security microcontroller 414, and factory setup application 416 with device authentication 417.

This embodiment provides the use of security microcontroller 414 for key storage, key generation and message signing. The use of security microcontroller 414 boosts the solution robustness because private keys are generated within the security microcontroller 414, private keys are stored within the security microcontroller 414, private keys never leave the security microcontroller 414, and the security microcontroller 414 chip reads are disabled.

One or more embodiments of this disclosure provide that any malicious attempts done to pry open the chip and read its content self-destructs the data stored internally. One or more embodiments of this disclosure also provide some level of parallelism is achieved and CPU availability is improved for other critical operations by offloading of the signing operation to the security microcontroller 414.

The message signing operation, as shown in FIG. 3, requires access to private keys during IKE main mode. As a result, it is a default operation done within the security microcontroller 414.

One or more embodiments of this disclosure provide the use of low frequency clock speed on FPGA and a low latency I2C bus for microcontroller integration to reduce power consumption and support extended temperature ranges. DCS embedded nodes are installed in environments where support is required for extended temperature ranges (−70 degree Celsius to 80 degree Celsius). As result, embedded nodes are constrained by a limited set of allowed clock speeds for its processors and supporting peripherals.

In this architecture, the below clock speeds help meet the power consumption and increase performance relative to a software only approach where the software executes on a dual core ARM processor at 666 Mhz, FPGA clock speed at 100 Mhz, and the security microcontroller 414 is connected over a 100 Khz dedicated I2C bus to the dual core ARM processor. With a clock speed of 100 MHz and a low latency I2C bus configuration, one or more of the embodiments herein achieve better results in total performance while staying within power constraints in our environment.

One or more embodiments of this disclosure provide the use of FPGA for RNG, ECDH and Message verification, and the use of FPGA for ephemeral key generation in IKE negotiations. The inherent benefits from FPGA further improve performance. FPGA leverages hardware parallelism and breaks the paradigm of sequential execution, thus accomplishing more per clock cycle. Additionally, improved robustness is achieved due to increased uncertainty or randomness (entropy) of numbers generated by a true RNG (relative to a software based RNG). One or more embodiments of this disclosure provide the use of FPGA for IKE ephemeral key generation (subsequently used for create shared secret) due to the length of the key validity.

Figure 5A:
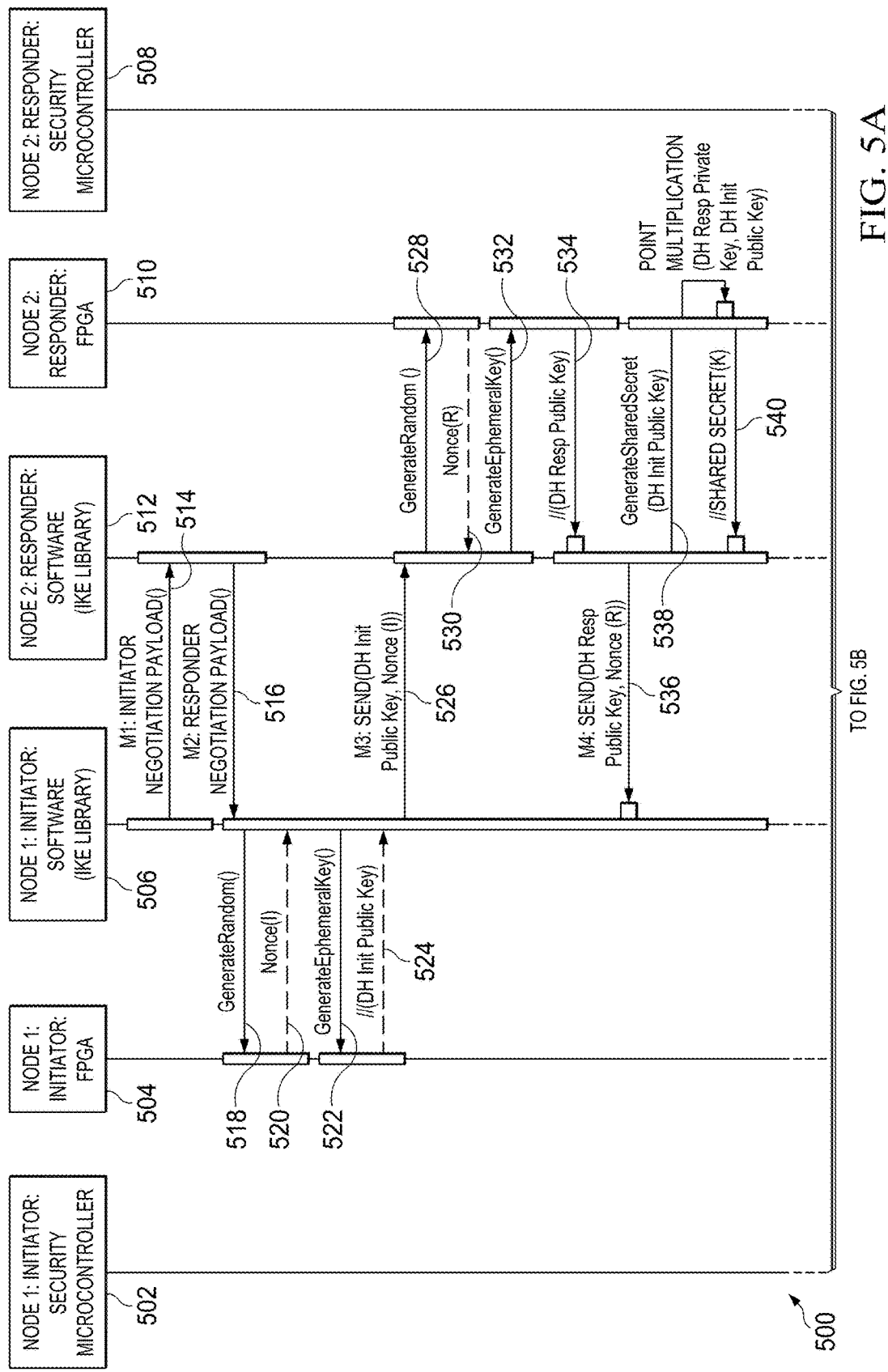
FIGS. 5A-5C illustrate an example signaling diagram for IKE main mode according to this disclosure.
Figure 5B:
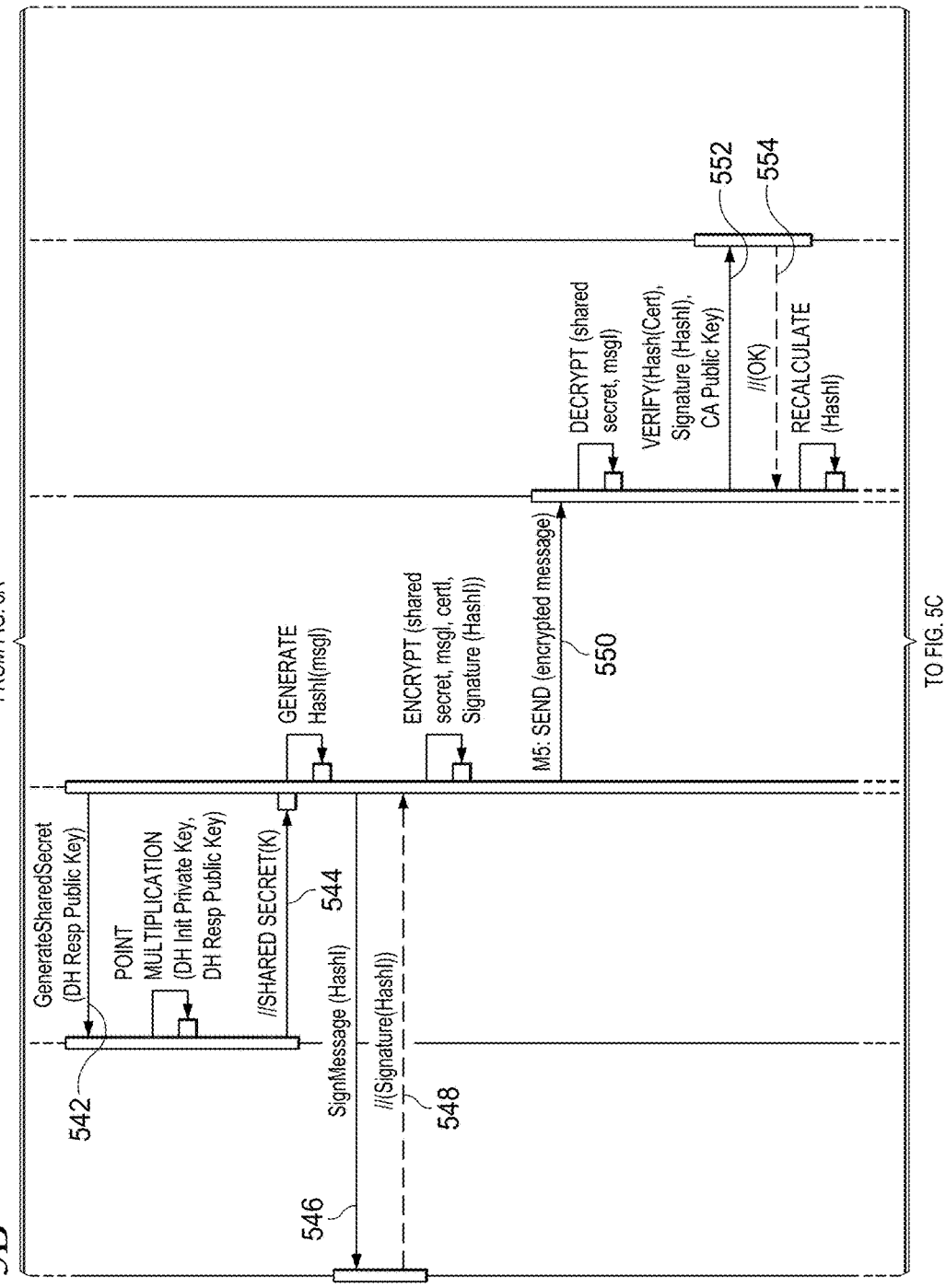
Figure 5C:
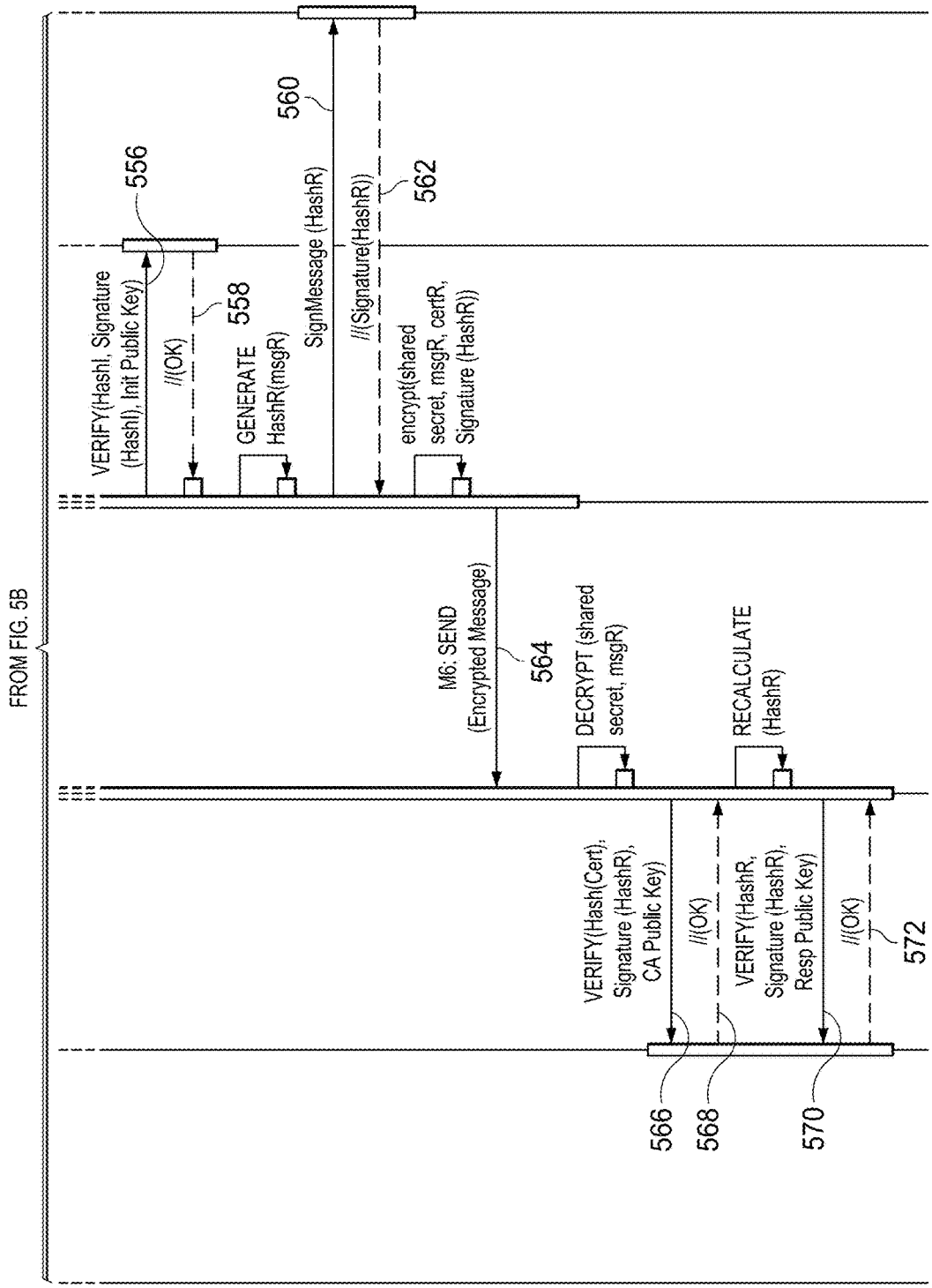

FIGS. 5A-5C illustrate an example signaling diagram 500 for IKE main mode according to this disclosure. Diagram 500 shows the proposed change in the distribution of security construct execution for IKE main mode using the embedded security architecture 400 of FIG. 4. The signaling in FIGS. 5A-5C is shown between an initiator node and a responder node. The first node can be an initiator and include security microcontroller 502, FPGA 504, and IKE library 506. The second node can be a responder and include security microcontroller 508, FPGA 510, and IKE library 512. The diagram 500 includes messages m1-m6 similar to those in FIG. 3.

At messages 514 and 516, IKE libraries 506 and 512 negotiate SA payloads that will be used in subsequent protocol communication.

At message 518, IKE library 506 sends a random nonce request to FPGA 504 and receives, at message 520, a nonce in return. At message 522, IKE library 506 sends an ephemeral key request to FPGA 504 and receives, at message 524, a DH initiator public key in return. Similarly, at message 528, IKE library 512 sends a random nonce request to FPGA 510 and receives, at message 530, a nonce in return. At message 532, IKE library 512 sends an ephemeral key request to FPGA 510 and receives, at message 534, a DH responder public key in return. At messages 526 and 536, IKE libraries 506 and 512 perform DH key agreement and nonce exchange.

At messages 538 and 540, a shared secret is generated from these messages to use for subsequent protocol communication. At message 538, IKE library 512 sends a shared secret request using the DH initiator public key to FPGA 510. The FPGA 510 generates the shared secret using the DH responder private key and a DH initiator public key. At message 540, FPGA 510 sends the shared secret to IKE library 512.

Similarly, at messages 542 and 544, a shared secret is generated to use for subsequent protocol communication. At message 542, IKE library 506 sends a shared secret request with the DH responder public key to FPGA 504. The FPGA 504 generates the shared secret using the DH initiator private key and a DH responder public key. At message 544, FPGA 504 sends the shared secret to IKE library 506.

The IKE library 506 can generate an initiator hash of an initiator message. At message 546, the IKE library 506 sends a sign request for the initiator hash to security microcontroller 502. The security microcontroller 502, at message 548, returns a signature of the initiator hash to the IKE library 506. The IKE library 506 encrypts the initiator message, initiator public key certificate, and signature using the shared secret. At message 550, the IKE library 506 sends the encrypted message to the IKE library 512.

The IKE library 512 decrypts the initiator message using the shared secret. The IKE library 512 sends, at message 552, the signature and initiator public key certificate to the FPGA 510 for verification, which returns, at message 554, the verification. The IKE library 512 then recalculates the initiator hash. The IKE library 512 sends, at message 556, a request for verification of the initiator hash and signature with the initiator public key to the FPGA 510 for verification, which returns, at message 558, an OK for verification.

The IKE library 512 can generate a responder hash of a responder message. At message 560, the IKE library 512 sends a sign request for the responder hash to security microcontroller 502. The security microcontroller 502, at message 562, returns a signature of the responder hash to the IKE library 512. The IKE library 512 encrypts the responder message, responder public key certificate, and signature using the shared secret. At message 564, the IKE library 512 sends the encrypted message to the IKE library 506.

The IKE library 506 decrypts the initiator message using the shared secret. The IKE library 506 sends, at message 566, the signature and responder public key certificate to the FPGA 510 for verification, which returns, at message 568, the verification. The IKE library 506 then recalculates the responder hash. The IKE library 506 sends, at message 570, a request for verification of the responder hash and signature with the responder public key to the FPGA 504 for verification, which returns, at message 572, an OK for verification.

Although FIGS. 5A-5C illustrate one example of an industrial process control and a signaling diagram 500 for IKE main mode, various changes may be made to FIGS. 5A-5C.

Encrypted communication helps ensure confidentiality and integrity of communication information to embedded devices. However, it is not sufficient against threats when there is physical access to the device or when non-standard access channels (or backdoors) are utilized. The typical attack vectors that are mitigated are:

Memory based exploits to gain code execution on the target.

Gain persistence by writing exploit code to persistent storage, such as bootkit—exploit executes as part of low level system boot process; rootkit—exploit executes as part of operating system; and a virus—exploit executes as regular, potentially privileged application or system service.

Gain persistence by manipulating software image offline, e.g., direct flash re-write.

The runtime validation of the software is difficult. Hence, a combination of signed firmware and secure boot capability is the default selection to prevent the above exploits.

One or more embodiments of this disclosure provide a secure boot solution for key usage, and first stage boot loader (FSBL) and second stage boot loader (SSBL) validation. The secure boot solution as disclosed herein provides validating modules or partition validation using asymmetric key cryptography.

Figure 6:
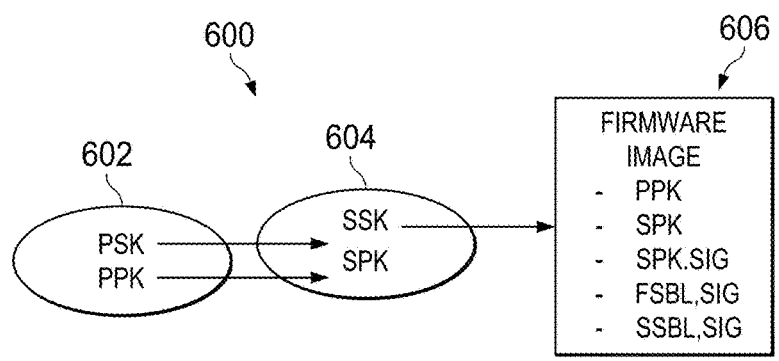
FIG. 6 illustrates an example key validation infrastructure according to this disclosure.

FIG. 6 illustrates an example key validation infrastructure 600 according to this disclosure. The key validation infrastructure 600 describes primary and secondary key uses. There are two pairs 602 and 604 of asymmetric keys enabling a secure boot feature. They are a primary key pair and secondary key pair. The keys in these pairs are labeled as RSA Primary Secret Key (PSK), RSA Primary Public Key (PPK), RSA Secondary Secret Key (SSK) and RSA Secondary Public Key (SPK).

SPK is signed by the PSK and a package of PPK, SSK, SPK and SPK.SIG is delivered to the secondary key owner by the primary key owner. Subsequently, SSK is used to sign the image hash signature. An image with its certificate (containing PPK, SPK, SPK.SIG, imageHash.SIG) forms the signed image 606.

In one example embodiment, the key management details of using this two key pair design are as follows:

The primary keys 602 are owned and maintained by the root authority. The secret key is utilized only when issuing a secondary key pair 604 for a new product. A hash of the public key is stored in onetime programmable internal memory (efuse) in each device during manufacturing. The primary secret key is physically protected and disconnected from the network until a need for the additional secondary key pair 604 is required. The secondary key pair 604 is owned and maintained by the product SCM team.

In the example embodiment, the key validation sequence is as follows:

A firmware hash is calculated in the embedded device and compared to the signed image hash (a match is a successful criteria). The SPK is used to validate the signed image hash. A SPK hash is calculated in the embedded device and compared to the signed SPK hash (a match is a successful criteria). The PPK is used to validate the signed SPK hash. A PPK hash is calculated and compared to the PPK hash stored in the efuse, a part of the processing system on the system-on-chip (a match is a successful criteria). The firmware is validated if all success criteria are met.

Figure 7:
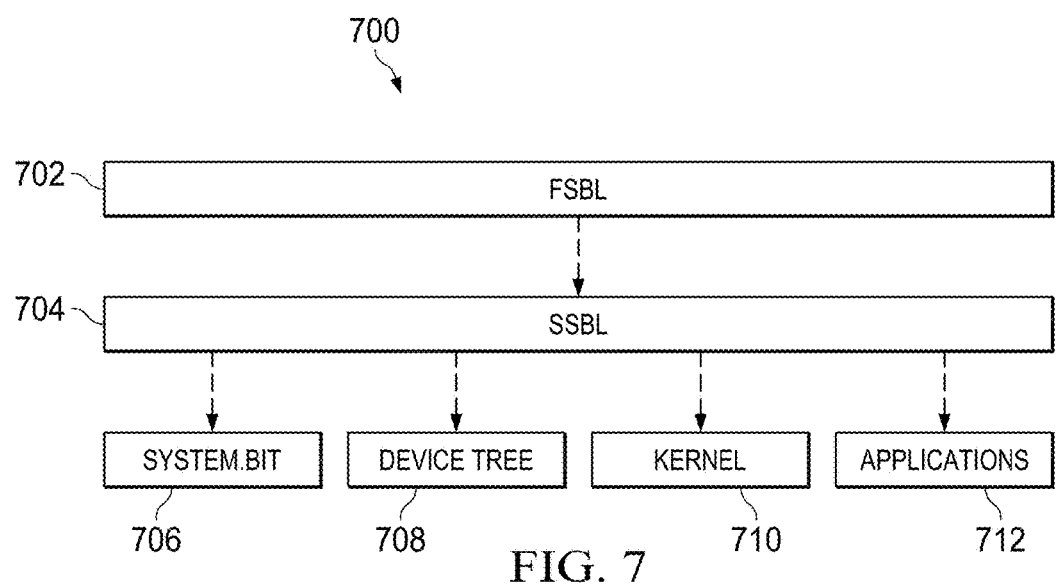
FIG. 7 illustrates an example chain of trust according to this disclosure.

FIG. 7 illustrates an example chain of trust 700 according to this disclosure. The chain of trust 700 displays the chain of trust between partitions built for embedded nodes. The system-on-chip engine validates the FSBL 702 prior to its execution. The FSBL 702 validates the SSBL 704 and loads the SSBL 704. The SSBL then validates the remaining modules 706-712 (or partitions) prior to loading modules 706-712. The execution is transferred to the Kernel 710 for subsequent processing.

Figure 8:
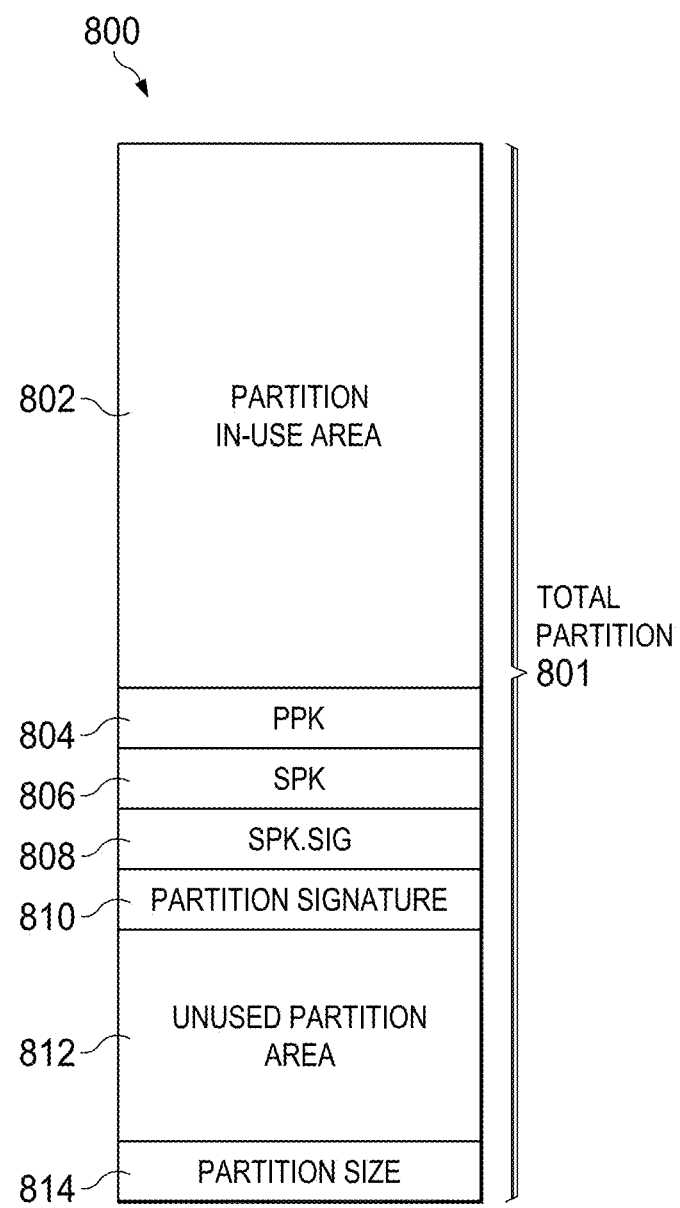
FIG. 8 illustrates an example partition design according to this disclosure.

FIG. 8 illustrates an example partition design 800 according to this disclosure. A total partition 801 of partition design 800 includes an in-use area 802, PPK 804, SPK 806, SPK.SIG 808, partition signature 810, unused area 812, and partition size 814. In one example embodiment, each partition other than FSBL and SSBL is packaged as shown in partition design 800. The PPK 804, SPK 806, SPK.SIG 808, and partition signature 810 are packaged together right after the image. The partition size 814 is included at the end of the partition and includes the total size of in use area 802, PPK 804, SPK 806, SPK.SIG 808.

Figure 9:
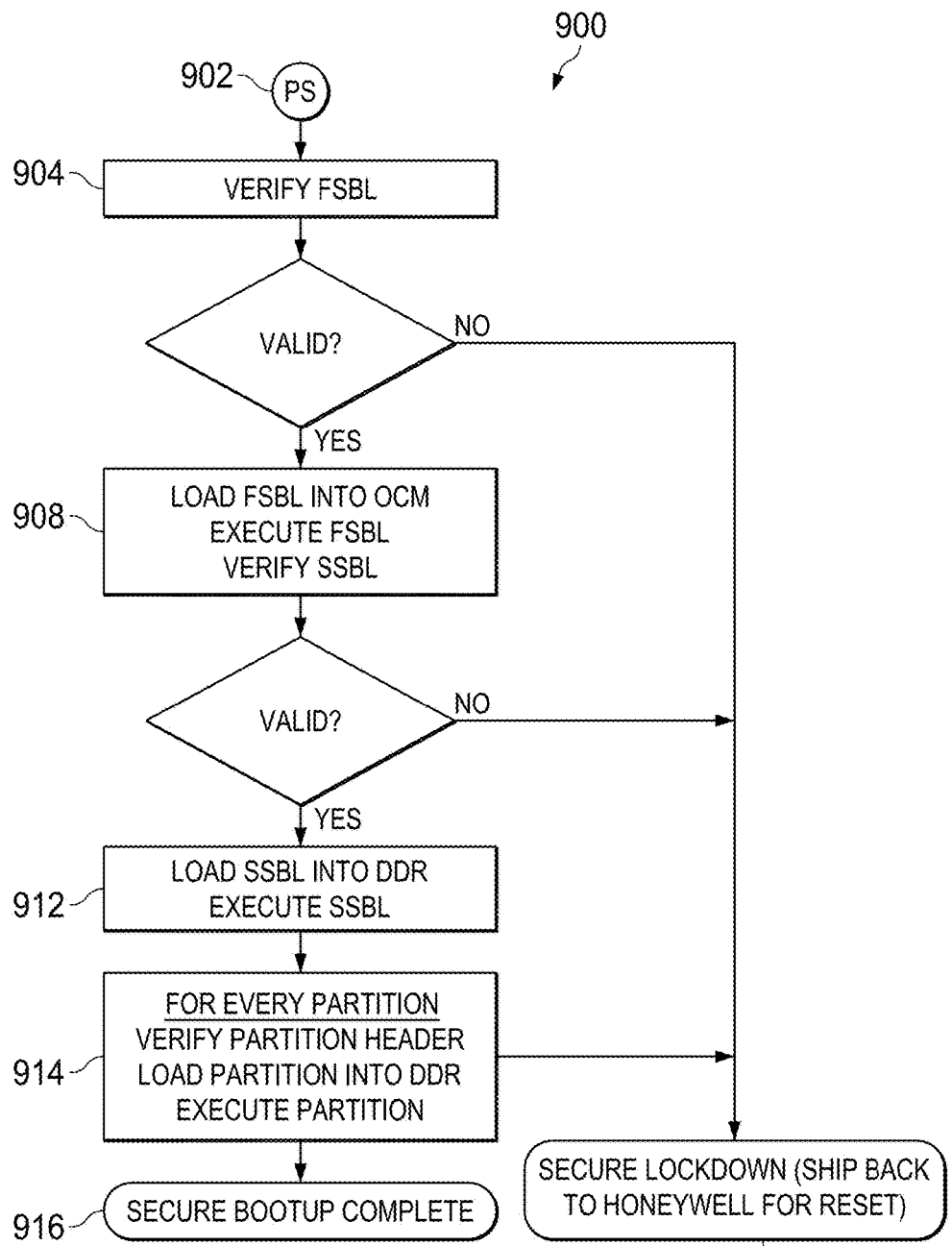
FIG. 9 illustrates an example secure boot process according to this disclosure.

FIG. 9 illustrates an example secure boot process 900 according to this disclosure. The secure boot process 900 provides for a node to enter a lock down mode when a partition validation fails to succeed. The lock down mode protects against a number of attacks mentioned above. Only a manufacturer to avoid introducing backdoor techniques for defeating the secure boot capability can recover a locked down embedded device.

At operation 902, a processor loads a partition scheme. At operation 904, the processor loads and verifies a first stage boot loader (FSBL). If the FSBL is valid, the processor, at operation 908, loads the FSBL into on-chip memory, executes the FSBL, and loads and verifies the second stage boot loader (SSBL). If the SSBL is valid, the processor, at operation 912, loads the SSBL into memory (such as double data rate synchronous dynamic random-access memory) and executes the SSBL.

At operation 914, for every partition, the processor verifies a partition header, loads each partition into the memory, and executes each partition. At operation 916, the secure boot is complete.

If at operation 904 or 908, the FSBL or SSBL are invalid, the processor enters secure lockdown at operation 918. Also, if at operation 914, any of the partition headers are invalid, the processor enters secure lockdown at operation 918. Once in secure lockdown, the processor must be unlocked by the manufacturer or agent of the manufacturer.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
using a first distributed control system (DCS) node:
exchanging a security association policy with a second DCS node over a network;
receiving a public key of the second DCS node using the security association policy;
sending the public key of the second DCS node to a field programmable gate array of the first DCS node;
receiving a shared secret generated by the field programmable gate array based on the public key of the second DCS node;
generating a hash of a message based on the shared secret;
signing the hash of the message, wherein the hash of the message is signed based on a private key stored within a security microcontroller;
encrypting the message and the signed hash using the shared secret;
sending the encrypted message and signed hash to the second DCS node;
receiving an encrypted message from the second DCS node;
decrypting the encrypted message received from the second DCS node using the shared secret to create a decrypted message;
calculating a hash of the decrypted message; and
sending a request for verification of the calculated hash to the field programmable gate array.

2. The method of claim 1, wherein signing the hash of the message comprises:
sending the hash to the security microcontroller; and
receiving the signed hash from the security microcontroller.

3. The method of claim 1, wherein chip reads of the security microcontroller are disabled.

4. The method of claim 3, further comprising, using the first DCS node:
corrupting at least some data on the security microcontroller in response to an attempt to pry open the security microcontroller and read the data.

5. The method of claim 1, further comprising, using the first DCS node:
requesting a public key of the first DCS node from the field programmable gate array; and
receiving the public key of the first DCS node.

6. The method of claim 1, further comprising, using the first DCS node:
requesting a random nonce from the field programmable gate array;
receiving the random nonce; and
sending the random nonce to the second DCS node.

7. An apparatus comprising:
a first distributed control system (DCS) node comprising:
at least one interface configured to communicate, over a network, with a second DCS node;
a field programmable gate array; and
at least one processing device configured to:
exchange a security association policy with the second DCS node;
receive a public key of the second DCS node using the security association policy;
send the public key of the second DCS node to the field programmable gate array;
receive a shared secret generated by the field programmable gate array based on the public key of the second DCS node;
generate a hash of a message based on the shared secret;
sign the hash of the message based on a private key stored within a security microcontroller;
encrypt the message and the signed hash using the shared secret;
send the encrypted message and signed hash to the second DCS node via the at least one interface;
receive an encrypted message from the second DCS node;
decrypt the encrypted message received from the second DCS node using the shared secret to create a decrypted message;
calculate a hash of the decrypted message; and
send a request for verification of the calculated hash to the field programmable gate array.

8. The apparatus of claim 7, wherein, to sign the hash of the message, the at least one processing device is configured to:
send the hash to the security microcontroller; and
receive the signed hash from the security microcontroller.

9. The apparatus of claim 7, wherein chip reads of the security microcontroller are disabled.

10. The apparatus of claim 9, wherein at least some data on the security microcontroller is corrupted in response to an attempt to pry open the security microcontroller and read the data.

11. The apparatus of claim 7, wherein the at least one processing device is further configured to:
request a public key of the first DCS node from the field programmable gate array; and
receive the public key of the first DCS node.

12. The apparatus of claim 7, wherein the at least one processing device is further configured to:
request a random nonce from the field programmable gate array;
receive the random nonce; and
send the random nonce to the second DCS node.

13. A non-transitory computer readable medium embodying a computer program, the computer program comprising computer readable program code that when executed causes at least one processor of a first distributed control system (DCS) node to perform operations including:
exchanging a security association policy with a second DCS node over a network;
receiving a public key of the second DCS node using the security association policy;
sending the public key of the second DCS node to a field programmable gate array of the first DCS node;
receiving a shared secret generated by the field programmable gate array based on the public key of the second DCS node;
generating a hash of a message based on the shared secret;
signing the hash of the message based on a private key stored within a security microcontroller;
encrypting the message and the signed hash using the shared secret;
sending the encrypted message and signed hash to the second DCS node;
receiving an encrypted message from the second DCS node;
decrypting the encrypted message received from the second DCS node using the shared secret to create a decrypted message;

calculating a hash of the decrypted message; and sending a request for verification of the calculated hash to the field programmable gate array.

14. The non-transitory computer readable medium of claim 13, wherein the computer readable program code that when executed causes the at least one processor to perform the operation of signing the hash of the message comprises:

computer readable program code that when executed causes the at least one processor to perform operations including:

sending the hash to the security microcontroller; and receiving the signed hash from the security microcontroller.

15. The non-transitory computer readable medium of claim 13, wherein the computer readable program code further comprises computer readable program code that when executed causes the at least one processor to perform an operation of:

corrupting at least some data on the security microcontroller in response to an attempt to pry open the security microcontroller and read the data.

16. The non-transitory computer readable medium of claim 13, wherein the computer readable program code further comprises computer readable program code that when executed causes the at least one processor to perform operations of:

requesting a public key of the first DCS node from the field programmable gate array; and receiving the public key of the first DCS node.

17. The non-transitory computer readable medium of claim 13, wherein the computer readable program code further comprises computer readable program code that when executed causes the at least one processor to perform operations of:

requesting a random nonce from the field programmable gate array;

receiving the random nonce; and sending the random nonce to the second DCS node.

* * * * *